US007801573B2

(12) United States Patent
Yazdi et al.

(10) Patent No.: US 7,801,573 B2
(45) Date of Patent: Sep. 21, 2010

(54) MAGNETIC HOLDER FOR RECHARGEABLE DEVICES

(75) Inventors: Reza Ahmadian Yazdi, Richmond (CA); Kenny Che, Vancouver (CA)

(73) Assignee: VTech Telecommunications Limited (HK)

( * ) Notice: Subject to any disclaimer, the term of this patent is extended or adjusted under 35 U.S.C. 154(b) by 789 days.

(21) Appl. No.: 11/643,878

(22) Filed: Dec. 22, 2006

(65) Prior Publication Data

US 2008/0150482 A1 Jun. 26, 2008

(51) Int. Cl.
*H04B 1/38* (2006.01)
(52) U.S. Cl. .................. 455/573; 572/575.1
(58) Field of Classification Search .......... 320/115; 455/425, 462, 465, 572, 573, 575.1, 426.1, 455/74.1, 574, 343.1–344
See application file for complete search history.

(56) References Cited

U.S. PATENT DOCUMENTS

| 5,013,997 | A | * | 5/1991 | Reese | 323/212 |
| 5,151,643 | A | * | 9/1992 | Emmert et al. | 320/115 |
| 5,909,100 | A | * | 6/1999 | Watanabe et al. | 320/108 |
| 6,210,201 | B1 | * | 4/2001 | Villain | 439/357 |
| 6,888,940 | B1 | * | 5/2005 | Deppen | 379/446 |
| 2004/0190802 | A1 | * | 9/2004 | Gomyo et al. | 384/100 |
| 2004/0263299 | A1 | * | 12/2004 | Noji | 335/229 |
| 2005/0217063 | A1 | * | 10/2005 | Paterson et al. | 15/325 |
| 2005/0225294 | A1 | * | 10/2005 | Bozzone et al. | 320/132 |

* cited by examiner

*Primary Examiner*—Kamran Afshar
*Assistant Examiner*—Marisol Fahnert
(74) *Attorney, Agent, or Firm*—McAndrews, Held & Malloy, Ltd.

(57) ABSTRACT

A charger cradle used for charging a battery of a portable electrical device. An electromagnetic device is disposed within the charger cradle proximate a metal piece of the cordless handset when the cordless handset is placed in a receiving portion of the charger cradle. The electromagnetic device generates a magnetic field when charge contacts of the charger cradle and the cordless handset are in contact and a charging current is conducted from a charging circuit of the charger cradle. The magnetic field attracts the metal piece of the cordless handset and securely holds the cordless handset into the receiving portion while the charging circuit charges the battery of the cordless handset.

13 Claims, 8 Drawing Sheets

MAGNETIC HOLDER FOR RECHARGEABLE DEVICES

BACKGROUND

I. Field of the Invention

The invention relates generally to a charger for a cordless handset, and more particularly, to a charger that can securely hold the cordless handset while the cordless handset is in a charge position.

II. Background of the Invention

Figure 1:
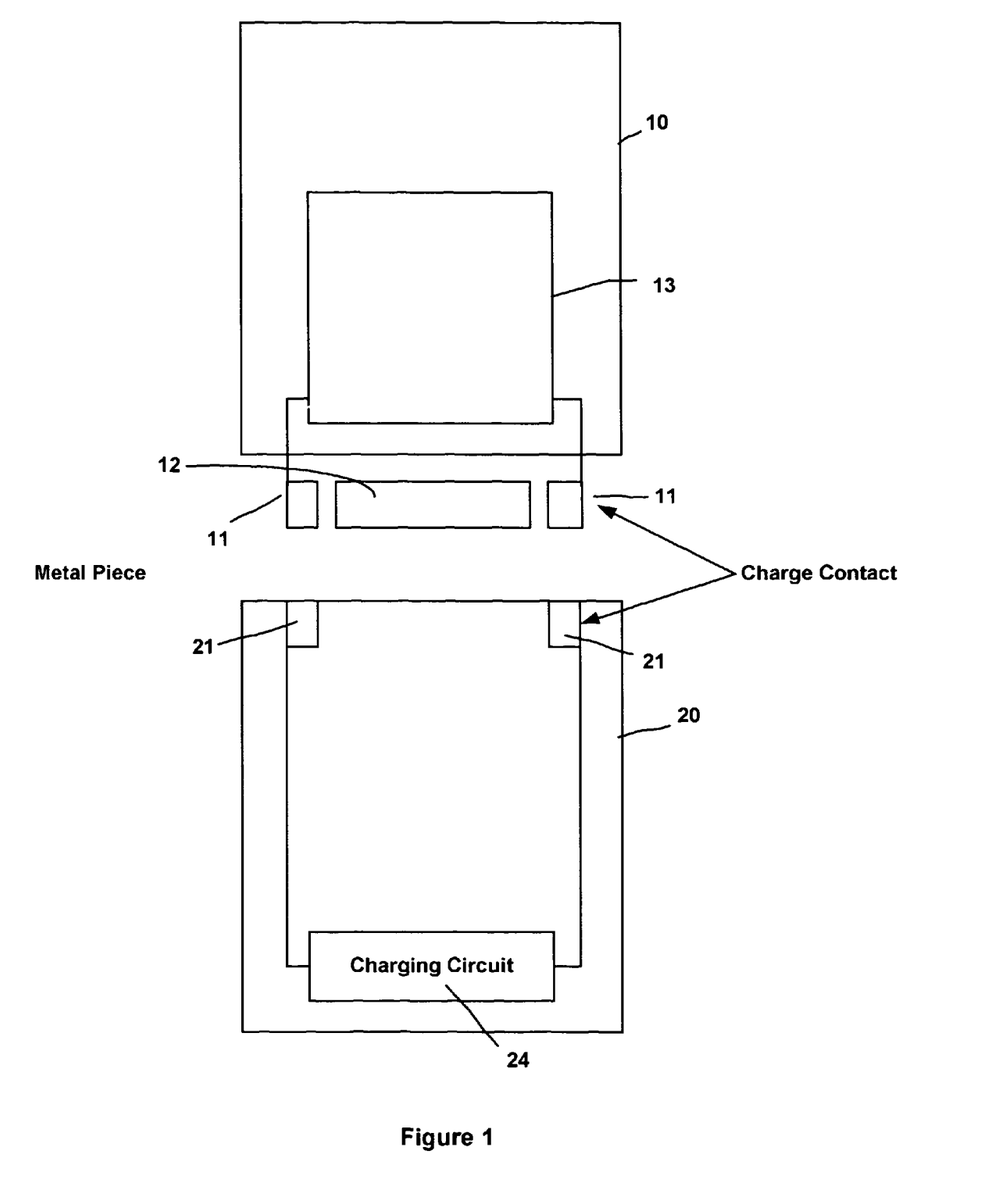
FIG. 1 is a schematic diagram showing a prior art charger cradle for holding a cordless telephone.

As known in the art, the electrical power used by cordless handsets is from chargeable batteries installed therein. As the amount of electricity provided by the chargeable batteries is limited, the chargeable batteries need be charged after being used for a period of time. Conventionally, while being charged, a cordless handset 10 is placed in a charger cradle 20, as shown in FIG. 1. Typically, the cradle 20 includes two contacts 21 for electrically connecting with two charger contacts 11 of the cordless handset. It is important to ensure that the handset's charger contacts have a proper contact at all times with the cradle contacts, otherwise the battery will not be charged properly. Also, the handset should be secured in the charger cradle and arranged so that it does not drop out of the charger cradle easily. For example, the handset should be sufficiently secure such that vibrators used as a ringing indicator should not vibrate the handset out of the cradle.

To meet the requirements mentioned above, the mechanical design of the handset is very important and cannot be underestimated. However, the design is limited by the industrial design of the handset and the charger cradle. With new slim designs for the handset and cordless telephones, designing a very stable handset and charger becomes a challenge and can limit the implementation of new designs.

Another problem that is common in cordless telephones is that the charger cradle is designed in a way to securely hold the handset in place. Such design, however, reduces the ventilation of air around the battery area and, during charging, causes the battery and handset to warm up and, in some cases, became too hot. To solve the problem, in some designs, the charger cradle does not completely surround the handset or some mechanical solutions (such as clips) are used to secure the handset in the charger cradle. However, such methods are more complicated and have other limitations.

Accordingly, it would be desirable to have a charger cradle that can secure the handset and prevent the handset from getting hot while charging without changing the industrial design.

BRIEF SUMMARY OF THE INVENTION

Certain embodiments of the invention provide a charger cradle for charging a battery of a cordless handset that securely holds the cordless handset while charging the cordless handset without changing the industrial design of the charger cradles.

In some embodiments of the invention, a charger cradle includes a receiving portion for receiving and holding a cordless handset therein, the receiving portion having an electrical contact for contacting with a charge contact of the cordless handset, and a charging circuit for providing a charging current to the cordless handset through the contact of the electrical contact of the receiving portion and the charge contact of the cordless handset. The receiving portion includes a holding device that generates a magnetic field when the electrical contact of the receiving portion and the charge contact of the cordless handset contact with each other to attract the cordless handset securely into the receiving portion.

Some embodiments of the invention provide a charger cradle for charging a battery of a cordless handset. The charger cradle includes a receiving portion for receiving the cordless handset, wherein the receiving portion includes an electrical contact, the electrical contact is located at a position corresponding to a charge contact of the cordless handset so that the electrical contact of the receiving portion contacts with the charge contact of the cordless handset, and a charging circuit for providing a charging current to charge the battery of the cordless handset when the electrical contact of the receiving portion is in contact with the charge contact of the cordless handset. The charger cradle further includes an electromagnetic device proximate to the receiving portion that generates a magnetic field when the electrical contact of the receiving portion and the charge contact of the cordless handset are in touch and the charging current is conducted for attracting a metal piece of the cordless handset into the receiving portion.

In some embodiments of the invention, the electromagnetic/holding device includes a ferrite core and coil windings surrounding the ferrite core that generates the magnetic field when a current flows there through.

In some embodiments of the invention, the electromagnetic/holding device includes a permanent magnet for attract the cordless handset into the receiving portion, and the permanent magnet is connected to the charging circuit by wires.

DETAILED DESCRIPTION OF THE INVENTION

Embodiments of the present invention provide a secure way for holding a cordless handset on a charger cradle while being charged. In accordance with the present invention, a magnetic field is generated by means of a charging current that attracts a metal part of the cordless handset to hold the cordless handset in place.

Figure 2:
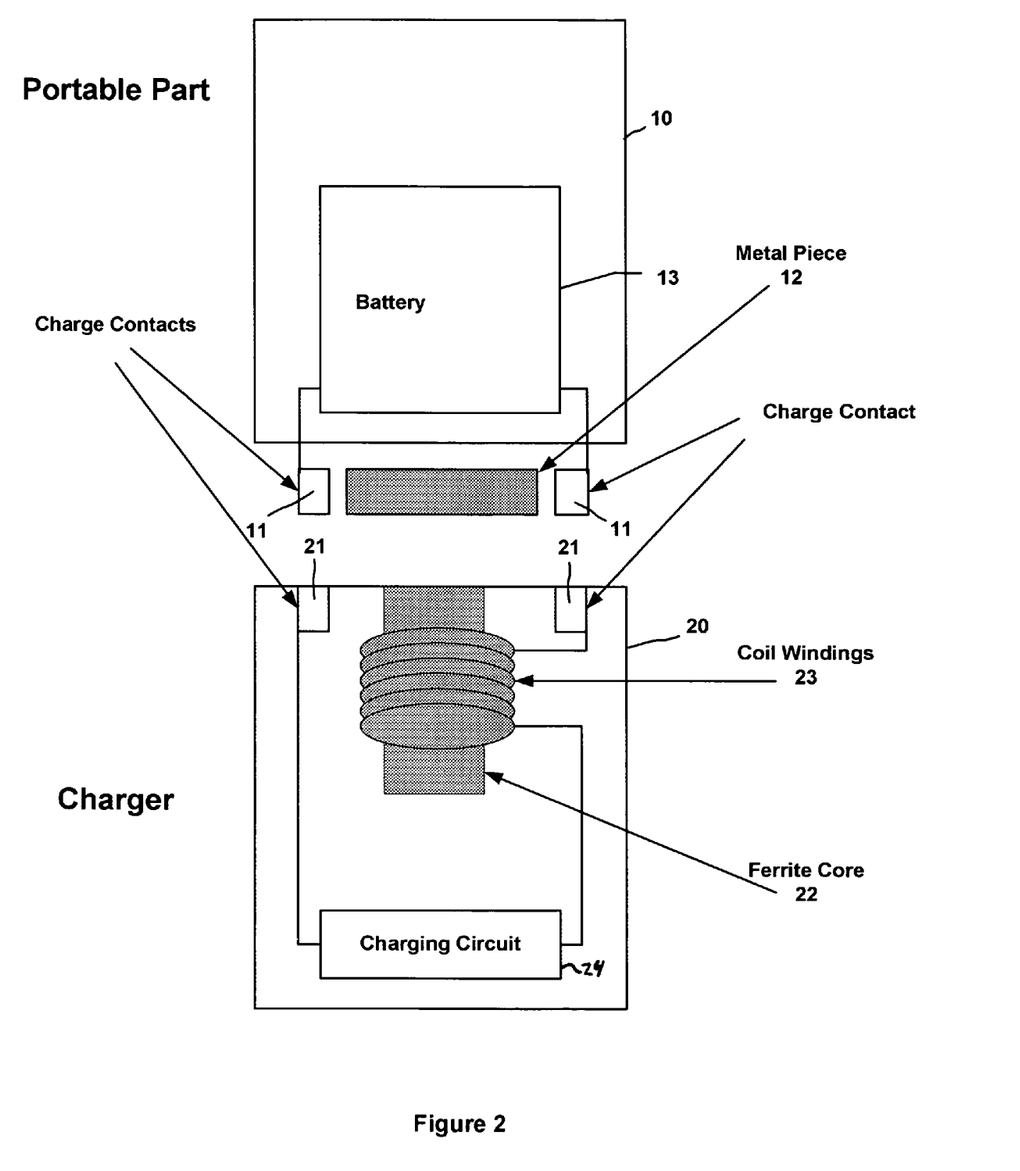
FIG. 2 is a schematic diagram showing a charger cradle for holding a cordless telephone in accordance with the present invention.
Figure 2A:
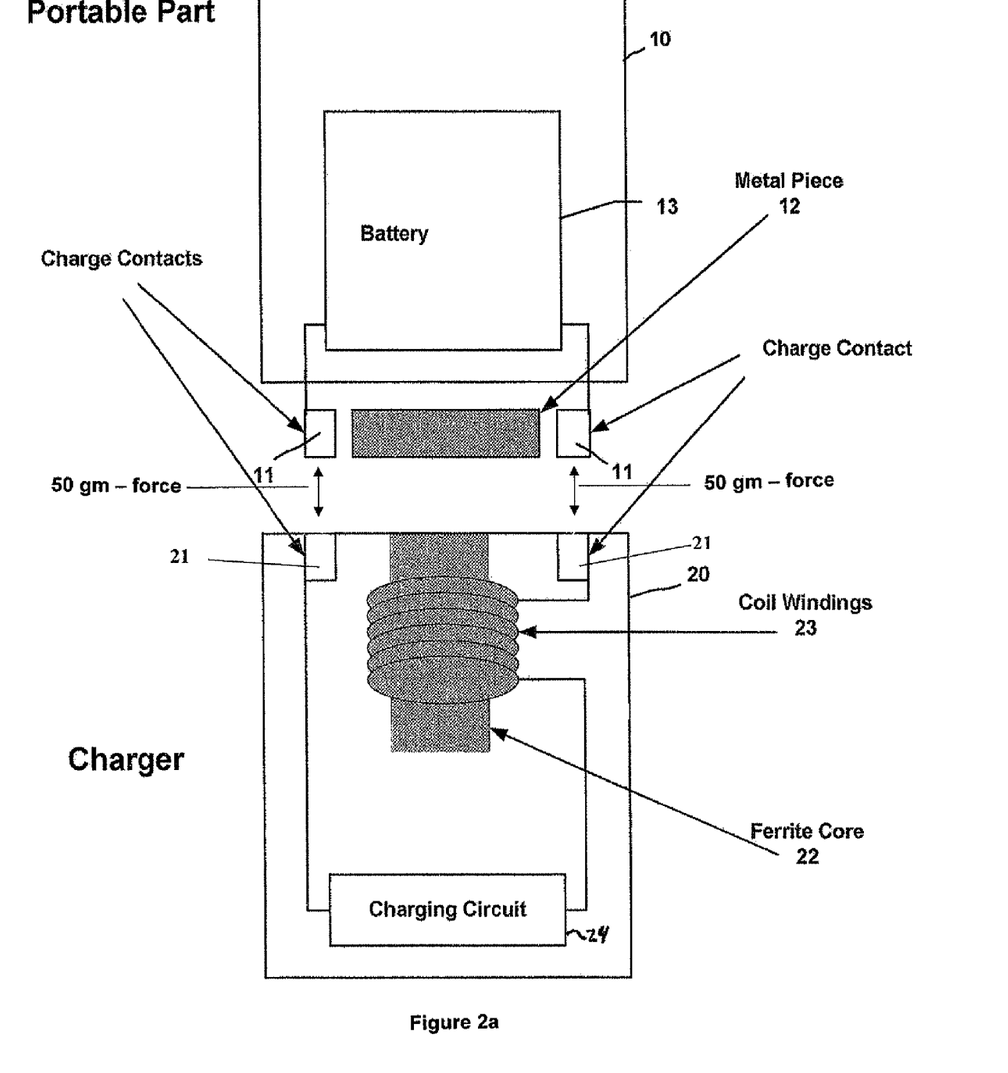
Figure 2B:
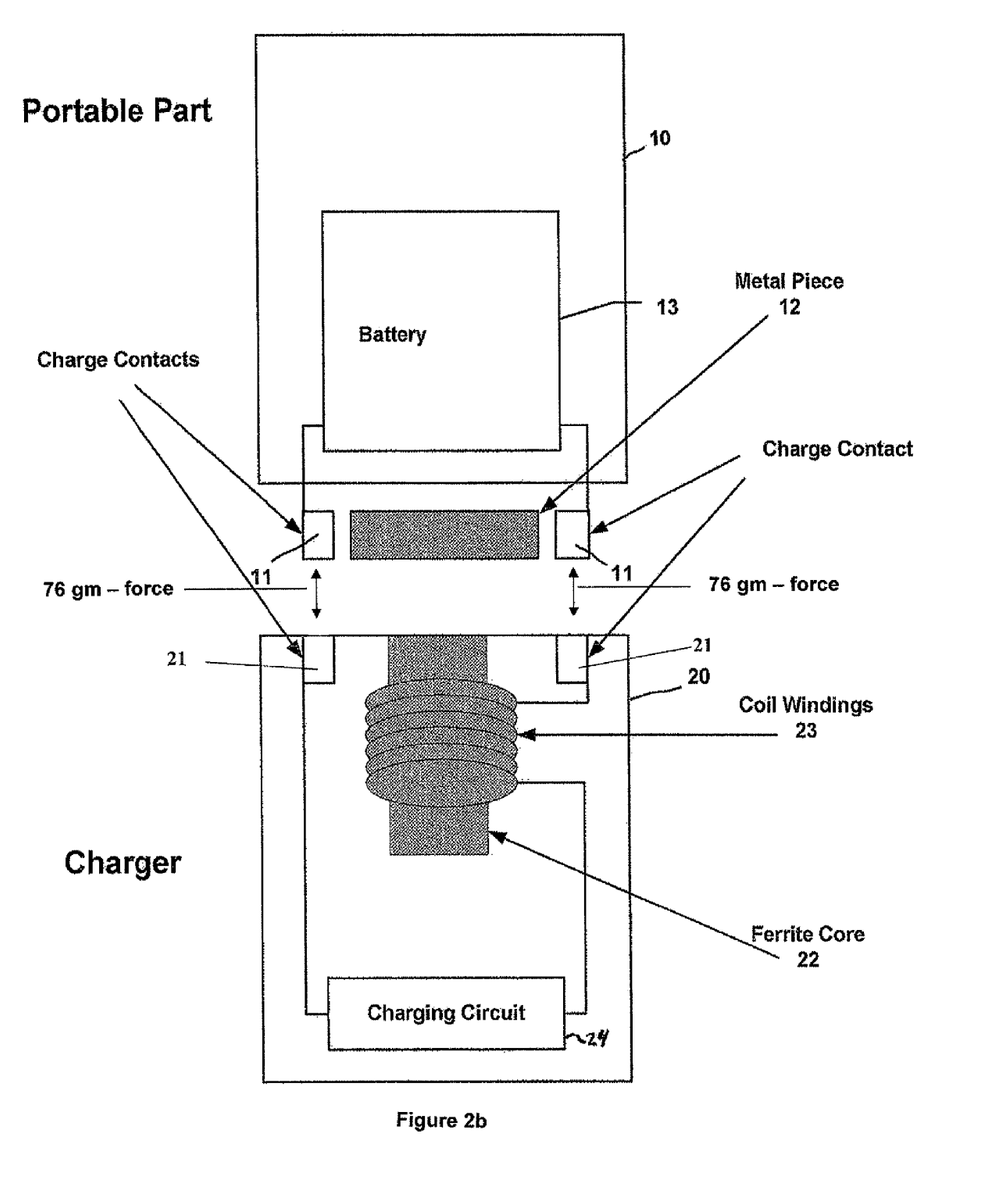

An exemplary embodiment of a charger cradle for holding a wireless handset in accordance with the present invention is illustrated in FIG. 2. In this figure, like elements shown in FIG. 1 are marked by similar reference numerals. As illustrated, charger cradle 20 includes a receiving part for receiving a cordless handset 10 that has charge contacts 21 therein for contacting with charge contacts 11 of cordless handset 10. Charge cradle 20 contains an electromagnetic solenoid device including a ferrite core 22 surrounded with coil windings 23 and a charging circuit 24. Cordless handset 10 is a conventional device that includes a battery 13 and a metal piece 12 on the bottom thereof proximate charge contacts 11.

According to a preferred embodiment of the invention, as soon as handset 10 makes contacts with charge cradle 20, a current flows through the electromagnetic solenoid device that causes a magnetic field to attract metal piece 12 of cordless handset 10 in charge cradle 20. The attraction of cordless handset 10 can securely holds cordless handset 10 in charge cradle 20 during a charging process. To remove cordless handset 10, a user need only apply enough force to detach cordless handset 10. As soon as one of the charge contacts is detached, the electromagnetic device loses its magnetic field so that cordless handset 10 can be removed easily.

The mechanical and electrical design of the electromagnetic device is simple and the magnetic field generated by the electromagnetic solenoid device is adjustable depending on factors such as a charge current, number of windings around the ferrite core and the core material. Therefore, embodiments of the invention need not require extra current. The invention takes advantage of the current flow from charging circuit 24 to cordless handset 10 used for charging battery 13 of cordless handset 10 to generate the magnetic field to hold cordless handset 10 in place. When cordless handset 10 is not placed in charge cradle 20, the magnetic field is automatically removed.

The design of the invention also improves heat dissipation. As the invention uses the magnetic field to secure cordless handset 10, it is not necessary that charge cradle 20 completely surround cordless handset 10 whereby heat generated during charging can be easily dissipated.

The electromagnetic solenoid device used in charger cradle 20 includes an electric conductor 23 that is wound N times about a magnetic member, e.g., ferrite core 22. In such device, a magnetic field is generated whenever a current is supplied to conductor 23 given that the current travels in a closed loop. Since a magnetic field is present, a mechanical force is induced and it can pull or push another magnetic material in a linear motion.

There are two ways to calculate the force of the magnet: one of them depends on the magnetic field of the device, and the other one uses an energy balance method. To determine which method to use, it is necessary to know the path of the magnetic flux. Magnetic flux always travels in a closed path in a core or across air gaps; for example, the magnetic flux may go from north to south poles in a solenoid system that does not have a core. However, a core is usually preferred in most systems since it concentrates the magnetic flux and increases the magnetic force by reducing the air gap or air resistance in between the poles. In such a case, the magnetic force is determined by the strength of the magnetic field. In systems where the core of a more complicated shape and the air gap is small, the energy method should be used.

The magnetic flux ($B_x$) generated by the electromagnetic solenoid device can be calculated as follows:

For a rectangular shaped core, $$B_x = \frac{B}{\pi}\left[\tan^{-1}\left(\frac{dtl}{tw}\sqrt{t^2 + w^2 + (d+l)^2}\right) - \tan^{-1}\left(\frac{d}{tw}\sqrt{t^2 + w^2 + d^2}\right)\right] \quad (1)$$

where $B_x$=Resultant flux between the solenoid electromagnetic device and steel [Tesla]

B=Magnetic flux density of the solenoid electromagnetic device [Tesla]

d=Distance between the solenoid electromagnetic device and the steel [m]

2t=height or thickness of the core [m]

2l=length of the core [m]

2w=width of the core [m]

in which $$B = k\mu_0 nI \quad (2)$$

where $\mu_0 = 4\pi \cdot 10^{-7}$ = Permeability of the medium [H/m]

k = Relative permeability [dimensionless]

$n = \frac{N}{l}$ [turns/m]

= Turn density

= Number of turns per meter

I = Current [Amp]

For a cylindrical core, the magnetic flux $B_x$ can be expressed as $$B_x = \frac{B}{2}\left[\frac{d+l}{\sqrt{(d+l)^2 + r^2}} - \frac{d}{\sqrt{d^2 + r^2}}\right] \quad (3)$$

$B_x$=Resultant flux between the solenoid electromagnetic device and steel [Tesla]

B=Magnetic flux density of the solenoid electromagnetic device, obtained from equation (2) [Tesla]

d=Distance between the solenoid electromagnetic device and the steel [mm]

l=Length of the core [mm]

r=Radius of the core [mm]

After $B_x$ is determined, the mechanical force can be obtained from the following expression:

$$F = 0.577 B_x^2 A \quad (4)$$

where

F=Force [lbs]

$B_x$=Resultant flux calculated using the equations above [Gauss]($\times 10^{-4}$ Tesla)

A=Area of the poles [in$^2$]

From the equations (1)-(4) above, the number of coils, the current applied, the length, material and geometry of the core, the distance between the core and the object are variables of interests in the electromagnetic device. A change in each of the variables may also lead to an increase or decrease in the magnetic force. The variables in the solenoid magnetic field and force equations are the design parameters of the system and the relationship between force and the variables will be determined to optimize the design.

According to the equations (1)-(4), the relationships between the force and the variables can be expressed as follows:

$F \propto I^2$

The force is proportional to the square of the current, so by doubling the current, the force will be increase by four times.

$F \propto N^2$

The force is proportional to the square of the number of coils, which is similar to the relationship of force and current.

$$F \propto \frac{1}{d}$$

The force is proportional to the inverse of the distance between the core and the ferrite object. Therefore one wants to double the force; the core must be moved closer to the ferrite object.

$$F \propto \frac{1}{l}$$

The force is inversely proportional to the length of the core. If one wants to double the force, the length needs to be shortened by a half.

$$F \propto A$$

The force behaves linearly with the surface area of the core. Doubling the force will require doubling the surface area.

Using the above relationships, one can roughly approximate a minimum magnetic force that is required to hold a cordless handset in place while charging if a given set of parameters is known.

According to the invention, it is estimated that 50 gram-force of attraction is sufficient to provide a tactile feeling when placing cordless handset 10 to charger cradle 20 and to reduce the chance of tipping over of cordless handset 10 when resting on cradle 20. Using the following design parameters, the measured force is found to be 76 gram-force. Such result is effective to securely hold cordless handset 10 in charger cradle 20.

| | |
|---|---|
| Number of Coils | 700 |
| Current | 500 mAmps |
| Separation | 0.70 mm |
| Geometry of Core | Diameter = 0.375 in |
| | Length = 1.5 in |
| Material of Core | 1018 low carbon steel |
| Relative Permeability | 2000 maximum |

Figure 3:
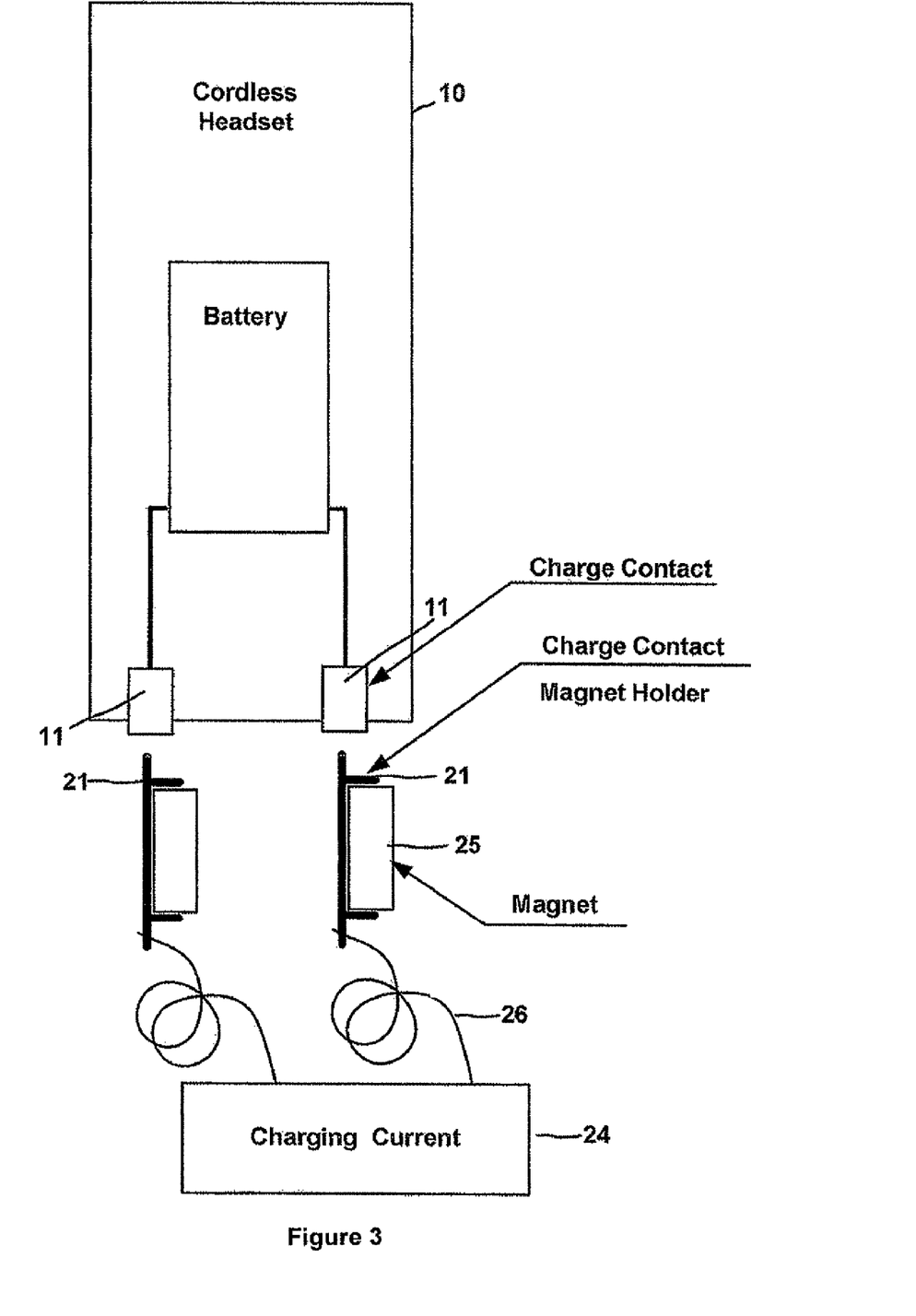
FIG. 3 illustrates another embodiment of the charger cradle in accordance with the present invention.
Figure 4:
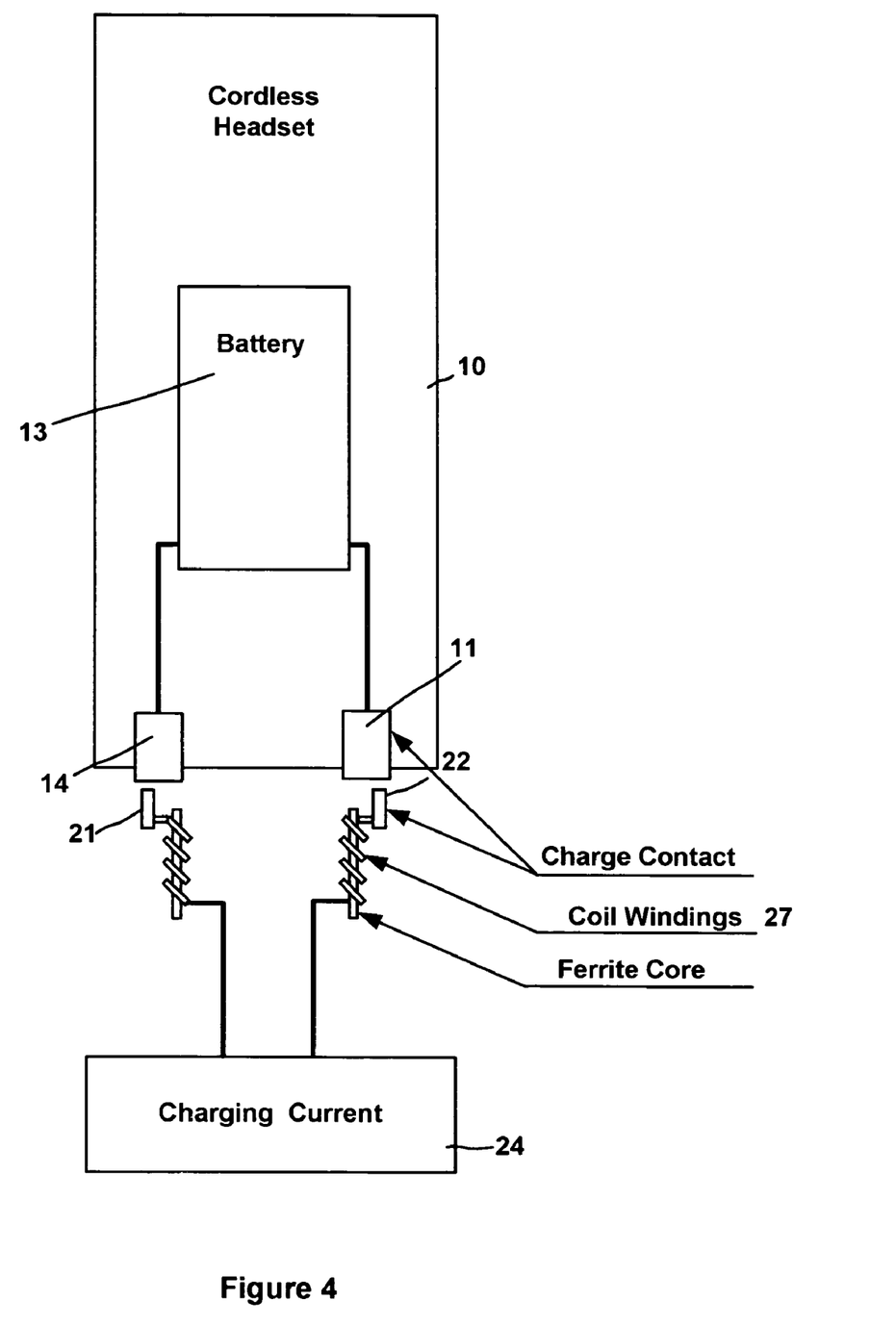
FIG. 4 illustrates another embodiment of the charger cradle in accordance with the present invention.
Figure 4A:
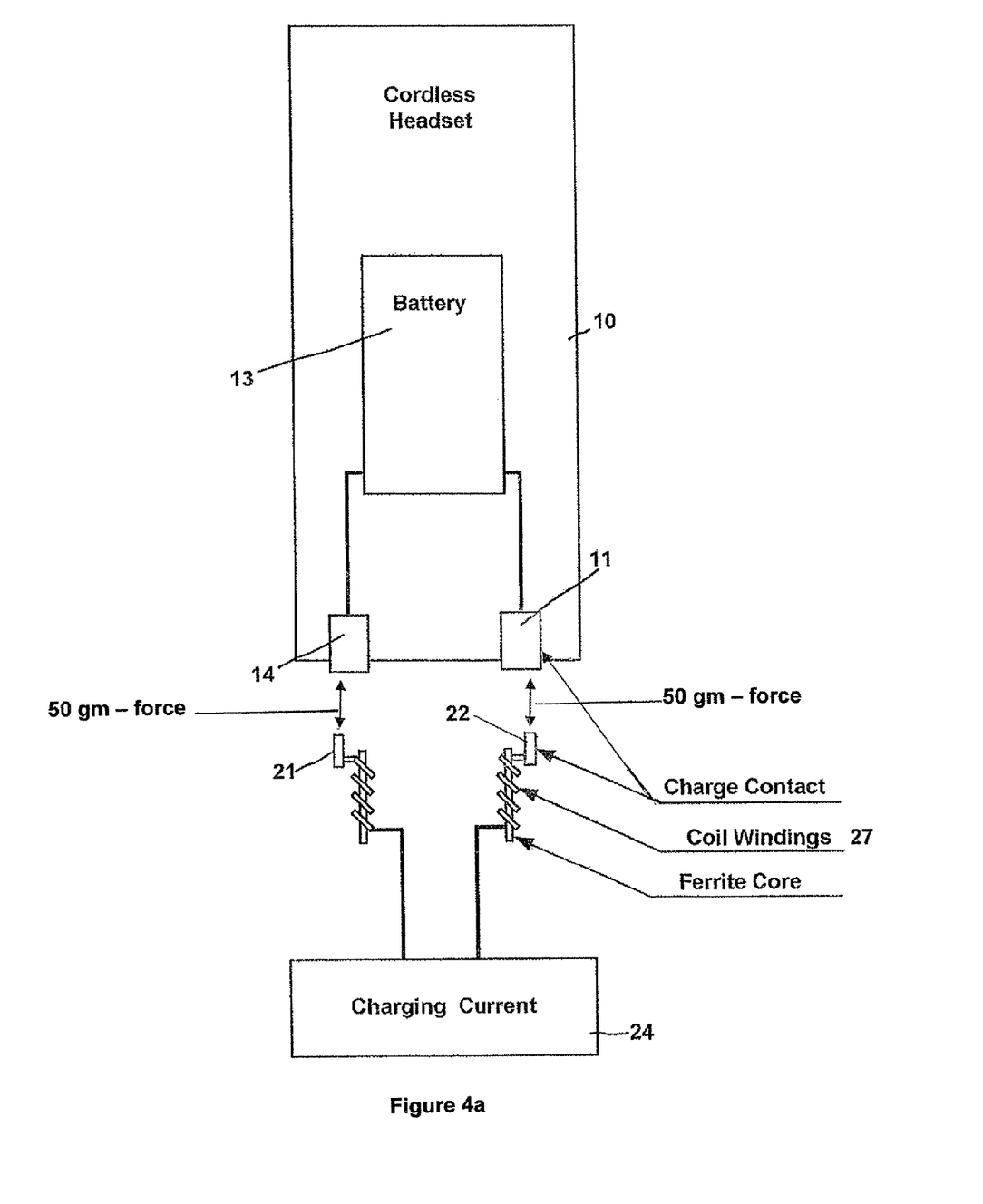
Figure 4B:
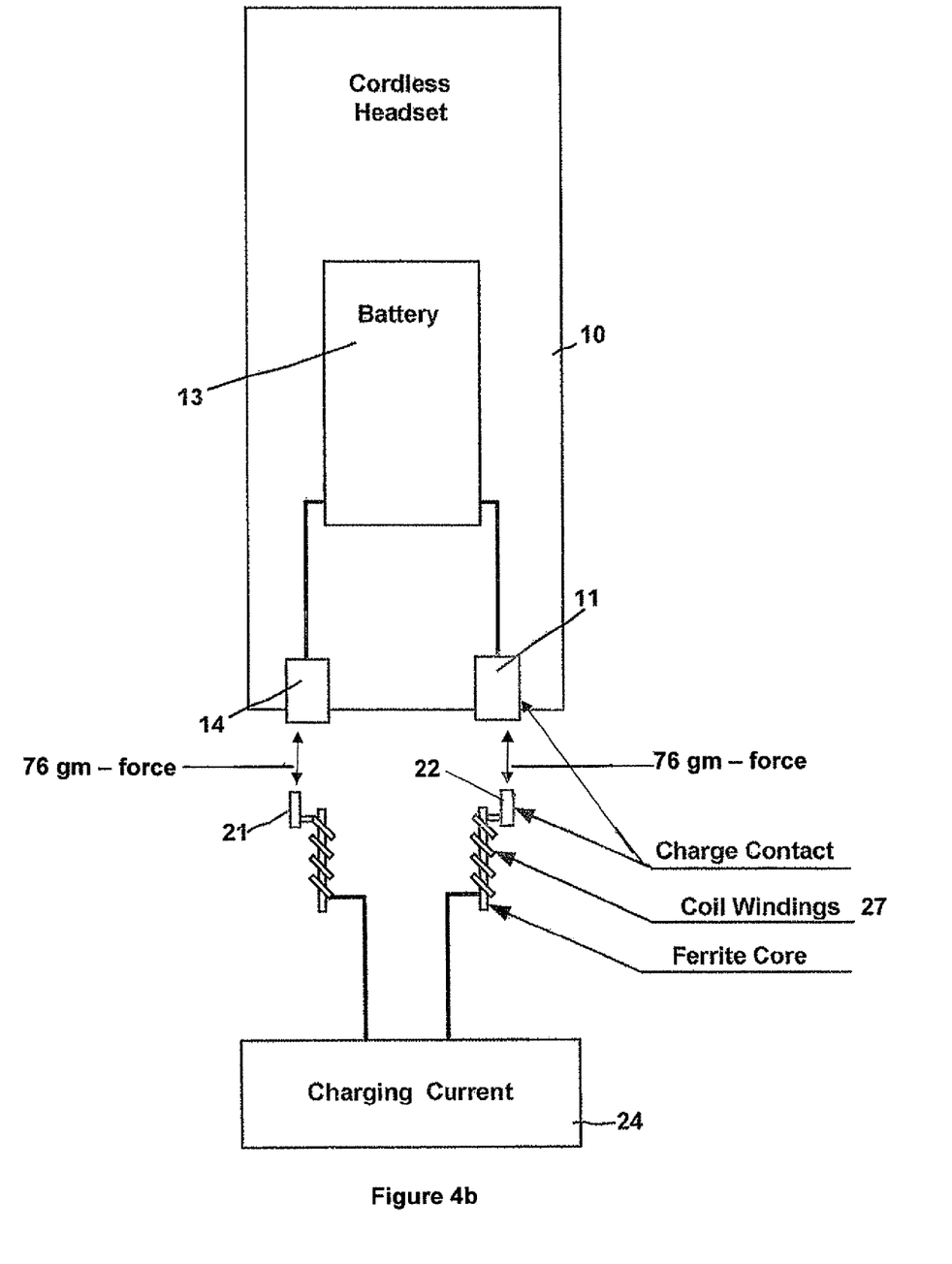

FIGS. 3 and 4 illustrate various embodiments of charge cradle 20 in accordance with the present invention. In FIG. 3, the device includes permanent magnets 25 each held by combination charge contact magnet holder 21a that is connected with charging circuit 24 via a wire 26. Permanent magnets may be used to augment the electromagnetic embodiment of FIG. 2 (or FIG. 4) or may be used separately from such embodiments. FIG. 4 shows that a circuit for coil 27 is separated from charging circuit 24. By applying an additional circuit, the coil current has more flexibility and is independent from the charging current that is usually in the range from 100 to 300 mA. Therefore, the current for coil 27 can go beyond the charging current, resulting in a significant increase in the mechanical force.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A charger cradle, comprising:
a receiving portion for receiving and holding a cordless handset therein, the receiving portion having an electrical contact for contacting with a charge contact of the cordless handset; and
a charging circuit for providing a charging current to the cordless handset through the contact of the electrical contact of the receiving portion and the charge contact of the cordless handset;
wherein the receiving portion includes a holding device that generates a magnetic field that provides at least 50 gram-force attraction when the electrical contact of the receiving portion and the charge contact of the cordless handset contact with each other to attract the cordless handset securely into the receiving portion,
wherein the holding device includes a ferrite core and windings surrounding the ferrite core,
wherein the ferrite core is rectangular, and
wherein a holding current flowing through the windings in the holding device is independent of the charging current provided by the charging circuit.

2. The charger cradle of claim 1, wherein the windings surrounding the ferrite core generate the magnetic field when a charge current provided by the charging circuit flows through the windings.

3. The charger cradle of claim 1, wherein the holding device includes a permanent magnet for attracting the cordless handset into the receiving portion.

4. The charger cradle of claim 3, wherein a permanent magnet holder is connected to the charging circuit by wires.

5. The charger cradle of claim 1, the magnetic field provides at least 76 gram-force attraction such that the handset is securely held yet is removable.

6. The charger cradle of claim 1, wherein a circuit for the holding device is serially connected with the charging circuit.

7. A charger cradle for charging a battery of a cordless handset, comprising:
a receiving portion for receiving the cordless handset, wherein the receiving portion includes an electrical contact, the electrical contact is located at a position corresponding to a charge contact of the cordless handset so that the electrical contact of the receiving portion contacts with the charge contact of the cordless handset;
a charging circuit for providing a charging current to charge the battery of the cordless handset when the electrical contact of the receiving portion is in contact with the charge contact of the cordless handset; and an electromagnetic device proximate the receiving portion that generates a magnetic field when the electrical contact of the receiving portion and the charge contact of the cordless handset touch one another and a holding current is conducted through the electromagnetic device resulting in the magnetic field that provides at least 50 gram-force attraction that attracts a metal piece of the cordless handset into the receiving portion, wherein the electromagnetic device includes a ferrite core and windings surrounding the ferrite core, wherein the ferrite core is rectangular, and wherein a holding current flowing through the windings in the holding device is independent of the charging current provided by the charging circuit.

8. The charger cradle of claim 7, wherein the metal piece of the cordless handset is located on a position corresponding to the electromagnetic device when the cordless handset is placed in the receiving portion.

9. The charger cradle of claim 7, wherein the electromagnetic device includes a permanent magnet for attracting the metal piece of the cordless handset into the receiving portion.

10. The charger cradle of claim 7, wherein the magnetic field provides at least 76 gram-force attraction such that the handset is securely held yet is removable.

11. The charger cradle of claim 7, wherein a circuit for the electromagnetic device is serially connected with the charging circuit.

12. A charger cradle for charging a battery of a cordless handset, comprising:

a receiving portion for receiving the cordless handset, wherein the receiving portion includes an electrical contact, the electrical contact is located at a position corresponding to a charge contact of the cordless handset so that the electrical contact of the receiving portion contacts with the charge contact of the cordless handset;

a charging circuit for providing a charging current to charge the battery of the cordless handset when the electrical contact of the receiving portion is in contact with the charge contact of the cordless handset; and a holding device comprising a permanent magnet proximate to the receiving portion that generates a magnetic field that attracts the receiving portion and the charge contact of the cordless handset to one another wherein the magnetic field provides at least 50 gram-force attraction, wherein the holding device includes a ferrite core and windings surrounding the ferrite core, wherein the ferrite core is rectangular, and wherein a holding current flowing through the windings in the holding device is independent of the charging current provided by the charging circuit.

13. The charger cradle of claim 12, wherein the magnetic field provides at least about 76 gram-force attraction such that the handset is securely held yet is removable.

* * * * *